United States Patent

Joseph et al.

[11] Patent Number: 6,009,430
[45] Date of Patent: Dec. 28, 1999

[54] METHOD AND SYSTEM FOR PROVISIONING DATABASES IN AN ADVANCED INTELLIGENT NETWORK

[75] Inventors: Rayappu F. Joseph, Plano; William A. Payne, Dallas, both of Tex.

[73] Assignee: Alcatel USA Sourcing, L.P., Plano, Tex.

[21] Appl. No.: 08/993,792

[22] Filed: Dec. 19, 1997

[51] Int. Cl.[6] .................................................. G06F 17/30
[52] U.S. Cl. .......................... 707/10; 707/204; 707/202; 379/50; 379/51; 379/88.01; 379/127; 379/114; 379/229
[58] Field of Search ................... 379/67, 88.01, 379/89, 51, 50, 127, 114, 229; 707/204, 202, 10

[56] References Cited

U.S. PATENT DOCUMENTS

| 5,353,335 | 10/1994 | D'Urso et al. | 397/67 |
| 5,774,533 | 6/1998 | Patel | 379/127 |
| 5,859,897 | 1/1999 | Furman et al. | 379/88.01 |
| 5,873,099 | 2/1999 | Hogan et al. | 707/204 |

FOREIGN PATENT DOCUMENTS

| 0772136 | 5/1997 | European Pat. Off. | G06F 17/00 |
| 9627835 | 9/1996 | WIPO | G06F 13/00 |

OTHER PUBLICATIONS

J. Kim, et al., "Design and Implementation of Service Database Management in the Combined SCP/SMS", Intelligent Networks, May 4–6, 1992, pp. 592–599.

N. Kusaura, et al., "Distribution of Service Data to Distributed SCPS in the Advanced In", IEEE, vol. 2, Nov. 1995, pp. 1272–1276.

*Primary Examiner*—Jack M. Choules
*Assistant Examiner*—Jean M Corriélus
*Attorney, Agent, or Firm*—Baker & Botts, L.L.P.

[57] ABSTRACT

A method of provisioning databases in a telecommunications system includes storing data for a telephony service in a plurality of redundant database nodes. An operation to be performed in the redundant database nodes is received and broadcast to the redundant database nodes for execution. Responses are received from the redundant database nodes. Each response includes an identification of the redundant database node transmitting the response and a result of executing the operation in the redundant database node. The results of the responses are automatically stored. In response to an event, the stored results are automatically queried to determine a status of the operation. The status of the operation is automatically reported.

20 Claims, 4 Drawing Sheets

METHOD AND SYSTEM FOR PROVISIONING DATABASES IN AN ADVANCED INTELLIGENT NETWORK

TECHNICAL FIELD OF THE INVENTION

This invention relates generally to the field of telecommunications, and more particularly to a method and system for provisioning databases in an advanced intelligent network (AIN).

BACKGROUND OF THE INVENTION

Consumers of telecommunications services are constantly demanding new and more advanced services to facilitate their personal communications. Examples of such services are free phone (FPH) services such as time dependent routing, calling card (CCD) services and virtual private network (VPN) services. Information associated with these services such as telephone and calling card numbers is typically stored in one or more databases.

Advanced telecommunications systems often include a service control point (SCP) that contains the databases. The service control point accesses the databases to provide routing and other information for the advanced services demanded by telephone users. For example, a service switching point (SSP) may transmit a dialed 1-800 number to the service control point to receive the actual routing number associated with the dialed 1-800 number. The actual routing number may vary depending on, for example, the time the dialed 1-800 number call was placed or the originating location of the dialed 1-800 number. A database in the service control point is accessed with the dialed 1-800 number, and information associated with the 1-800 number and an appropriate routing number is selected from the database for transmission back to the service switching point.

A customer of a telecommunications system such as, for example, MCI, Sprint, AT&T, or GTE, may provision the databases by accessing the service control point. Examples of provisioning the databases includes adding subscriber names and information to the databases, deleting subscriber names and information from the databases and updating current entries to reflect changes in data associated with a subscriber.

Conventional methods for provisioning databases suffer several disadvantages. For example, the databases are serially provisioned by sending an operation to a first database, waiting for a response from the first database, and then sending the operation to the second database and so on until all relevant databases have been provisioned. Because the provisioning is serial, provisioning times are prolonged and result in an inefficient use system resources.

SUMMARY OF THE INVENTION

In accordance with the present invention, a method and system for provisioning databases in an advanced intelligent network is provided that substantially reduces or eliminates disadvantages and problems associated with prior systems and methods. In particular, the method and system database provisioning using parallel processing to reduce provisioning time and resource use.

In one embodiment, the method of provisioning databases in a telecommunications system includes storing data for a telephony service in a plurality of redundant database nodes. An operation to be performed in the redundant database nodes is received and broadcast to the redundant database nodes for execution. Responses are received from the redundant database nodes. Each response includes an identification of the redundant database node transmitting the response and a result of executing the operation in the redundant database node. The results of the responses are automatically stored. In response to an event, the stored results are automatically queried to determine a status of the operation. The status of the operation is automatically reported.

Technical advantages of the present invention include providing an improved method and system of provisioning databases in a telecommunications network. In particular, an operation is broadcast to redundant database nodes for execution. Responses are received from the redundant database nodes. The responses include results from executing the operation in the redundant database nodes. The results are stored and subsequently queried to determine a status of the operation. Thus, the operation is processed by the redundant database nodes in parallel. As a result, provisioning times are reduced and system resources more efficiently used.

Other technical advantages will be readily apparent to one skilled in the art from the following figures, description, and claims.

BRIEF DESCRIPTION OF THE DRAWINGS

For a more complete understanding of the present invention, and its advantages thereof, reference is now made to the following description taken in conjunction with the accompanying drawings in which.

DETAILED DESCRIPTION OF THE INVENTION

Figure 1:
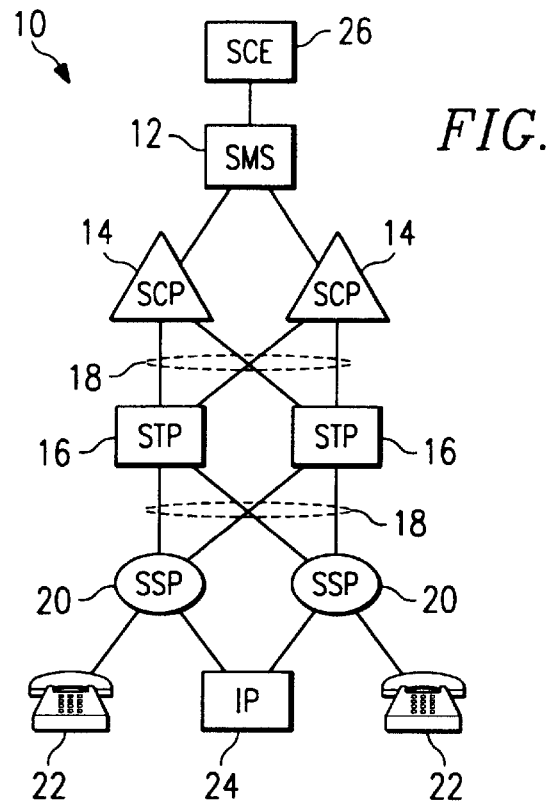
FIG. 1 is a block diagram illustrating an exemplary telecommunications network such as an advanced intelligent network (AIN) for use in connection with the present invention.

FIG. 1 is a block diagram illustrating an advanced intelligent network (AIN) 10 for use in connection with the present invention. The advanced intelligent network 10 includes a service management system 12 that interfaces with a plurality of service control points (SCP) 14 and a plurality of signal transfer points (STP) 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7 (SS7) link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete routing of a call. The service switching points 20 are part of a publicly switched telephone network (PSTN) and are coupled to the telephone service subscribers, which include wire-based telephones, wireless telephones 22 and intelligent peripherals 24.

A service creation environment 26 allows the creation and testing of service logic programs outside of the network 10. Completed service logic programs are downloaded to the service control points 14 and the signal transfer points 16 through the service management system 12 for execution on the network 10.

Figure 2:
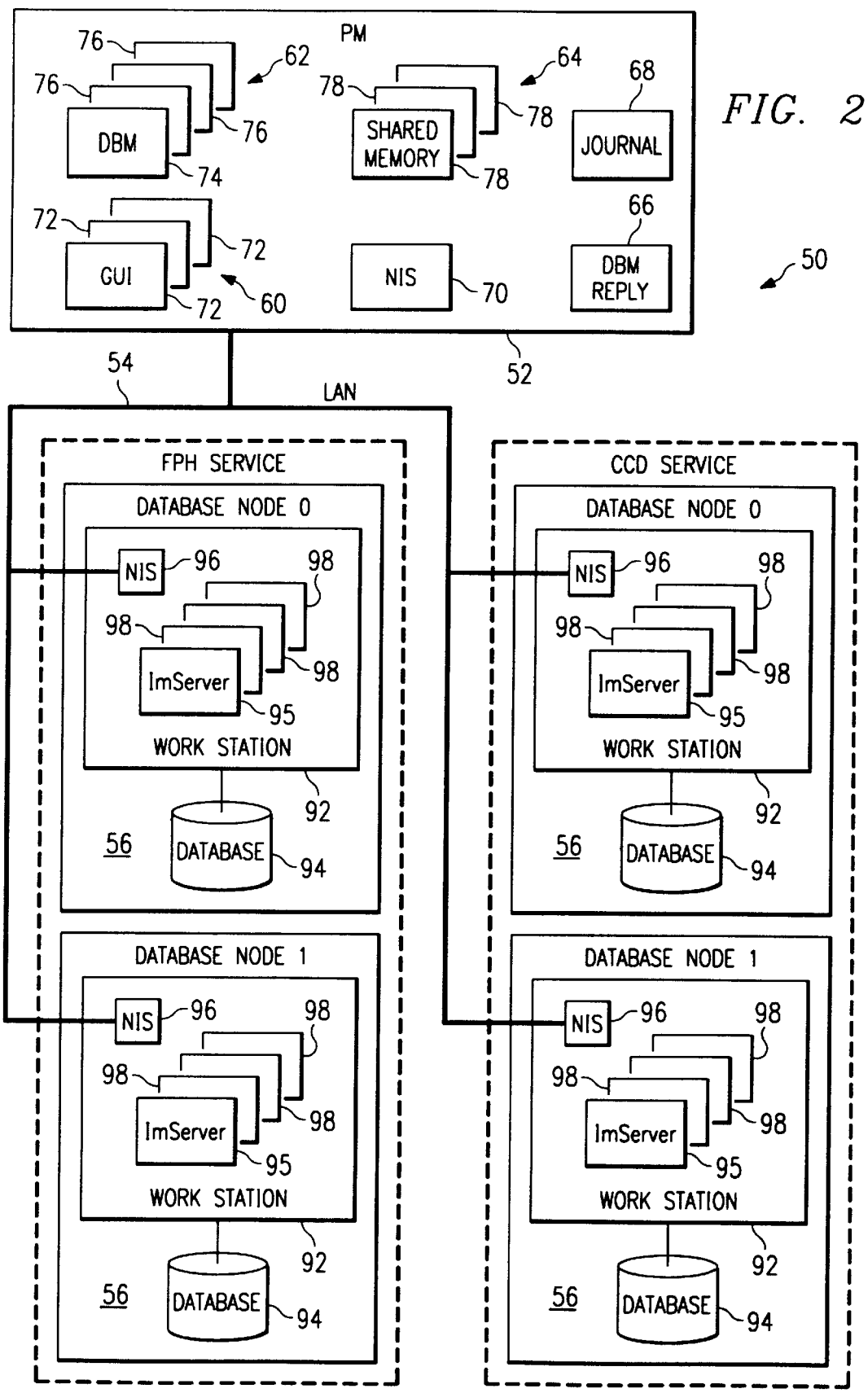
FIG. 2 is a block diagram illustrating a database system for an advanced intelligent network in accordance with the present invention.

FIG. 2 is a block diagram illustrating a database system 50 for use in the service control point 14 of the advanced intelligent network 10. In operation, the service control point 14 accesses the database system 50 to provide call routing information for telephony services, such as, for example, free phone (FPH) services, calling card (CCD) services and virtual private network (VPN) services. It will be understood that the database system 50 may be otherwise positioned within the network 10 as long as the service control points 14 or other network elements can access the database system 50 to retrieve call needed routing information.

Referring to FIG. 2, the database system 50 comprises a platform manager 52 in communication via a local area network (LAN) 54 with a plurality of redundant database nodes 56. A redundant platforming manager (not shown) may also be provided in the database system 50 as a back-up to the platform manager 52. The redundant platform manager is generally identical to the platform manager 52 and is activated in response to a failure of the platform manager 52.

The database nodes 56 are redundant in that sets of database nodes 56 may each support disparate services, with the database nodes 56 in each set storing the same call routing information for the service. Thus, the databases used for a service are equal and share the load. In one embodiment, for example, a first set of database nodes may support free phone (FPH) services and have database nodes 56 that each store the same free phone call routing information while a second set of database nodes may support calling card (CCD) services and have database nodes 56 that each store the same calling card call routing information. Other sets of database nodes 56 may be provided to support other services such as, for example, virtual private network (VPN) service. In a particular embodiment, for example, the database system 50 may include the five FPH database nodes 56, two CCD database nodes 56 and six VPN database nodes 56. The five FPH nodes are redundant to each other and share the load of FPH queries, the two CCD nodes are redundant to each other and share the load of CCD queries and the six VPN nodes are redundant to each other and share the load of VPN queries.

The platform manager 52 is a computer such as a file server, mainframe or any other type of computer capable of storing and processing data. A redundant platform manager (not shown) is also provided. The platform manager 52 includes computer software that is loaded into memory and executed by the processor of the platform manager 52. The computer software is generally identified by distinct modules, systems and files. It will be understood that the computer software may be otherwise combined or divided for processing without departing from the scope of the present invention. Accordingly, labels of the modules are for illustrative purposes and may be suitably varied.

The platform manager 52 comprises an interface 60, a database manager (DBM) 62, shared memory 64, reply manager (DBMReply) 66, journal file 68 and network interface system (NIS) 70. The interface 60 is a graphical user interface (GUI) operable to interact with an operator to receive operations for provisioning the database nodes 56 and to report the status of operations executed in the database nodes 56. The operations may be received from a UNIX workstation (not shown) or any other suitable platform. The operations may include start, update, delete, insert, lookup, abort, commit or any other suitable database provisioning operation.

A plurality of instances 72 of the interface 60 may be provided to allow a number of operators to simultaneously provision the database nodes 56. Each of the instance 72 of the interface 60 is generic and can be used in connection with the database nodes 56 of any telephony service.

The database manager 62 includes a main manager (DbmObj instance) 74 and a plurality of manager instances (DbModObj instance) 76 of the main manager 74. The main manager 74 receives an operation for a telephony service from the interface 60 and selects an available manager 76 to oversee the operation. The manager 76 transmits the operation to the appropriate database nodes 56 storing information for the telephony service and determines a status of the operation based on the results of responses that are returned from the database nodes 56 and stored in the shared memory 64 by the reply manager 66. The manager 76 also records operations that are successful in the journal file 68. The main manager 74 monitors the managers 76 and reports the status of operations to operators via the interface 60.

The shared memory 64 is a block or other suitable arrangement of random access or other type of memory. The shared memory 64 stores the results of operations executed in the database nodes 56. As described in more detail below, the operation is executed in the database node 56 by one of a plurality of provisioning modules, or ImServers. The ImServer returns a response to the reply manager 66 including an identification of the ImServer transmitting the response, the database node 56 of the ImServer and a result of the operation. The result may be successful, unsuccessful and the like. The reply manager 66 stores the result in the shared memory 64.

Figure 3:
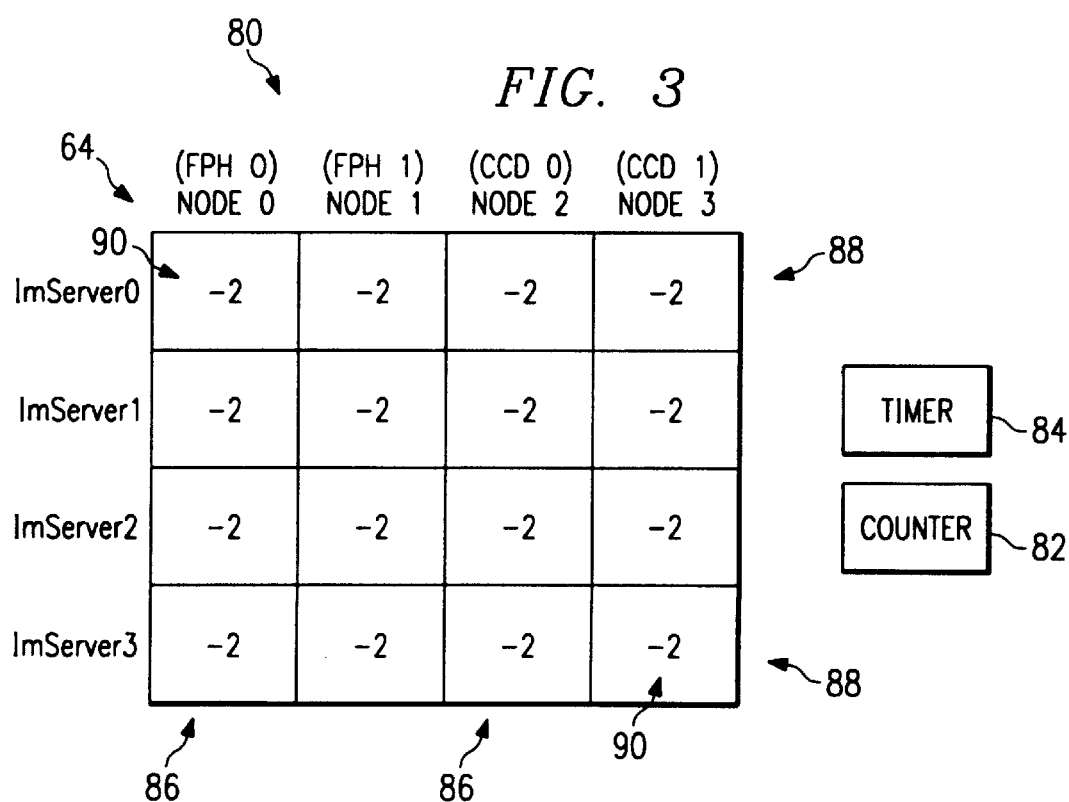
FIG. 3 is a block diagram illustrating details of a shared memory in accordance with the present invention.

FIG. 3 is a block diagram illustrating details of the shared memory 64. The shared memory 64 comprises a table 80, a counter 82 and a timer 84. The table 80 includes a column of memory cells 86 for each storage node 56 and a row of memory stores 88 for each ImServer of the database nodes 56. Thus, each ImServer of each database node 56 is associated with a separate memory store 90 in which a result of an operation executed by that ImServer in that database node 56 is stored. It will be understood that the shared memory 64 may be otherwise configured as long as the shared memory can suitably store the results of operations executed in the database nodes 56.

As described in more detail below, the memory stores 90 associated with an operation are initially set to a value of −2 by the manager 76 overseeing an operation. The manager 76 then sets the stores to a value of −1 in response to transmitting the operation to the database nodes 56. The reply manager 66 sets the memory stores 90 to a value of 0 in a response to an unsuccessful result, such as a failure, and to a value of 1 in response to a successful result to the operation. It will be understood that the other suitable values may be stored in the memory stores 90 to represent the results of operations executed in the database nodes 56.

The counter 82 is set by the manager 76 to the number of database nodes 56 to which an operation is transmitted for execution. The reply manager 66 decrements the counter for each response received from a database node 56. Thus, the counter will go to zero upon a response being received from each of the database nodes 56 to which an operation was transmitted.

The timer 82 is started by the manager 76 in response to transmitting an operation to the database nodes 56. As described in more detail below, the manager 76 will access the shared memory 64 to determine a status of an operation based on the results stored in the memory stores 90 upon the first occurrence of the counter 82 going to zero or the expiration of the timer 84. Thus, the initial value of the timer 84 represents the maximum amount of time the manager 76 will wait for an operation to be executed in the database nodes 56 and the results stored in the shared memory 64.

Returning to FIG. 2, a plurality of instances 78 of the shared memory 64 may be provided to each support one of the managers 76. Thus, each manager 76 utilizes a separate shared memory 64, including a separate counter 82 and timer 84.

The reply manager 66 receives responses from the database nodes 56. As previously described, the responses include identification of the ImServer transmitting the response, database node 56 of the ImServer and a result of executing the operation in the database node 56. The reply manager 66 stores the result in a memory store 90 associated with the ImServer of the database node 56.

The journal file 68 records successful operations. The journal file 68 is used by the main manager 74 to determine what, if any, operations an off-line database node 56 missed and therefore it needs to have provisioned to be current with related database nodes 56. The main manager 74 initiates such necessary provisioning.

The network interface system 70 communicates with the local area network 54 to transmit operations to the database nodes 56 and receive responses from the database node 56. The local area network 54 may be an integrated services digital network (ISDN) communication line, a hardware line, a telephone or any other suitable link.

The database nodes 56 each comprise a workstation 92 in communication with a database 94. The workstation 92 is a UNIX workstation or any other suitable platform capable of accessing the database 94. The workstation 92 includes an ImServer 95 and a network interface system (NIS) 96. The network interface system 96 communicates with the local area network 54 to receive operations transmitted by the platform manager 52 and to transmit responses generated by the ImServer 95.

The ImServer 95 receives an operation from the manager 76 and executes the operation in the database 94. The ImServer 95 then responds back to the reply manager 66 with the result of the operation. To allow a number of operations to be simultaneously executed in the database 94, a plurality of instances 98 of the ImServer 95 are provided in the workstation 92. Each of the instances 98 are operable to execute an operation in the database 94.

Figure 4A:
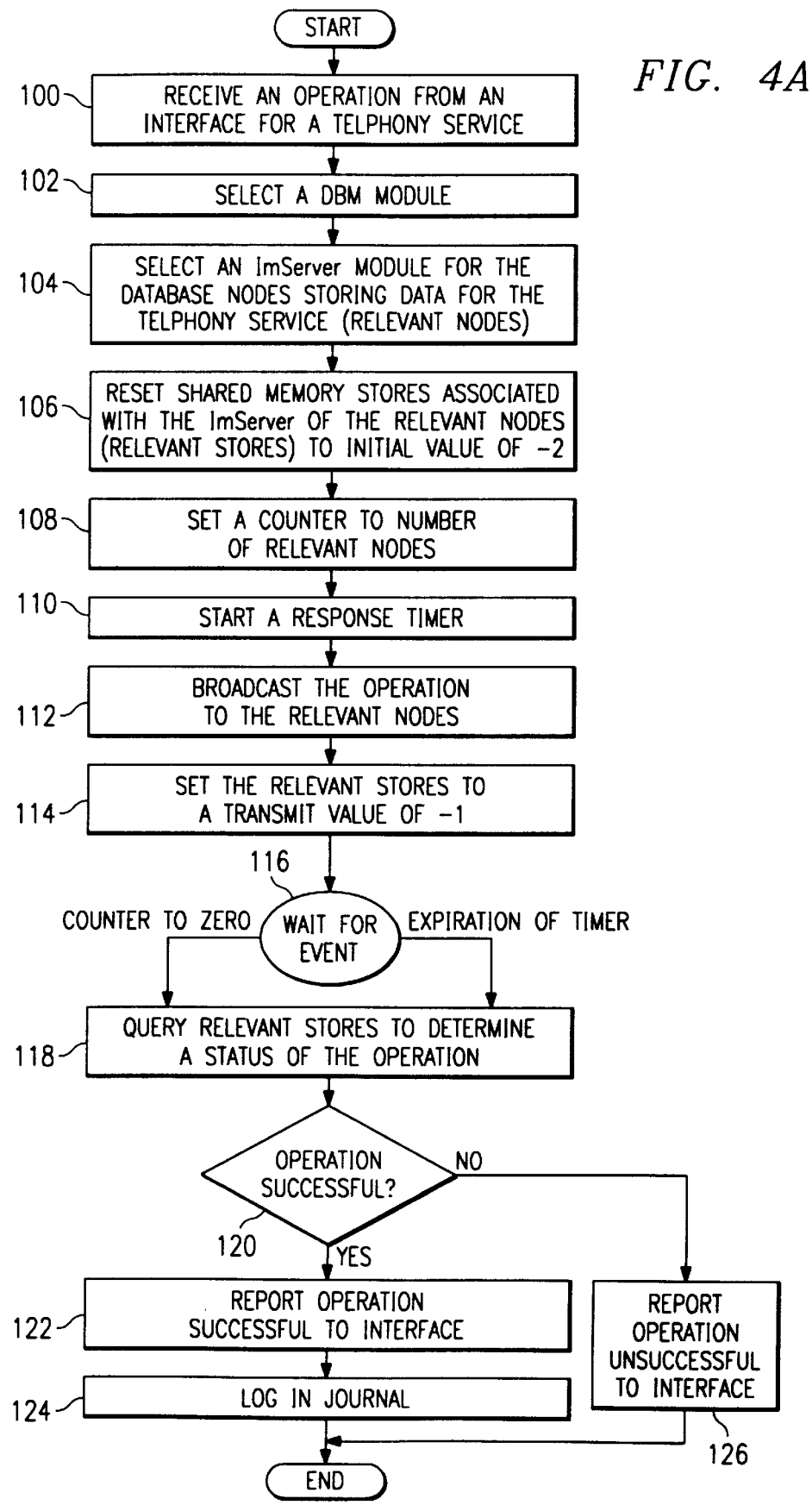
FIGS. 4A–B are flow diagrams illustrating a method of provisioning databases in accordance with the present invention.
Figure 4B:
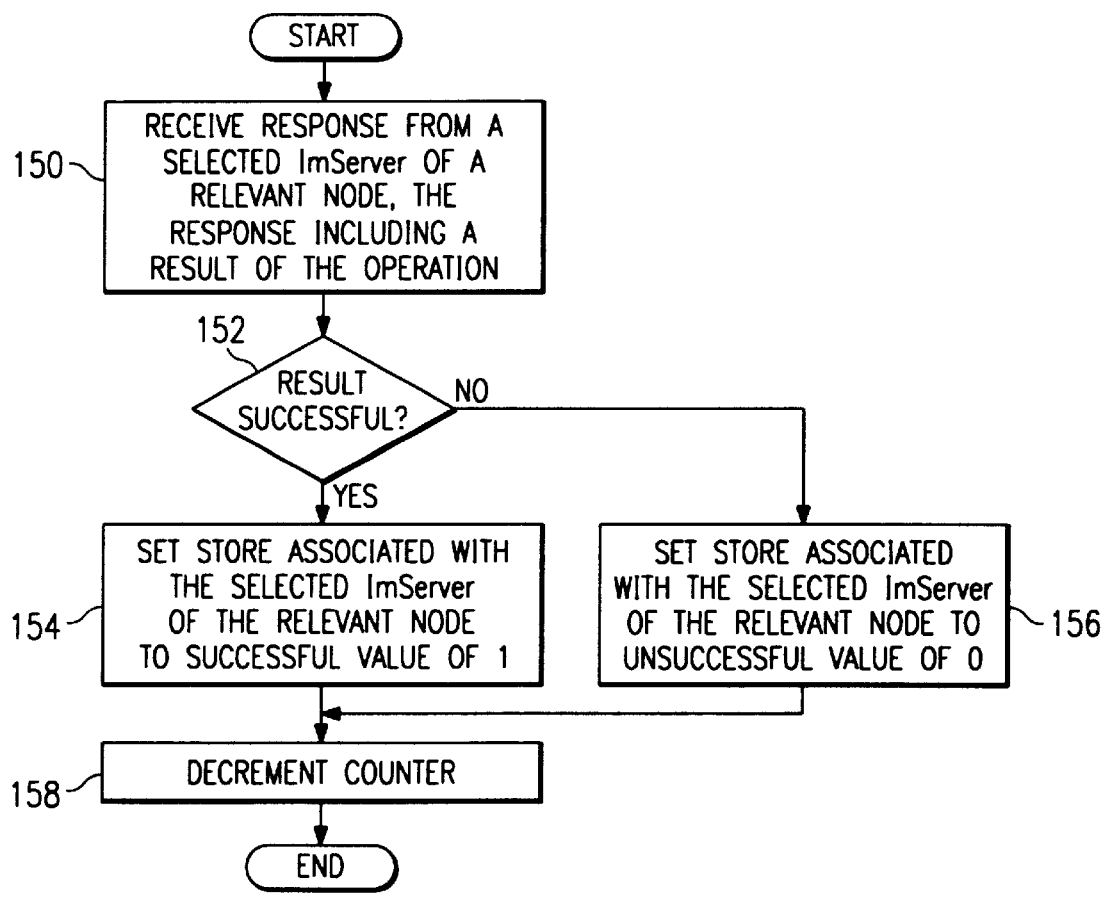

FIGS. 4A–B are flow diagrams illustrating a method of provisioning the database nodes 56 in accordance with the present invention. Referring to FIG. 4A, the method begins at step 100 in which the main manager 74 receives an operation from the interface 72 for a telephony service. At step 102, a manager 76 is selected to oversee the operation. At step 104, a set of related ImServers 94 is selected for the relevant database nodes 56 that store call routing information for the telephony service. The selected ImServer is related in that, for example, each of the ImServers is the first ImServer of the relevant database nodes 56. The manager 76 and set of related ImServers 94 may be selected based on availability, predefined order or any other suitable method.

Proceeding to step 106, the manager 76 accesses shared memory 64 and resets relevant memory stores 90 associated with the selected ImServers 94 of the relevant database nodes 56. The relevant memory stores 90 are reset to an initial value of −2. At step 108, the manager 76 sets the counter 82 to the number to relevant database nodes 56. At step 110, the manager 76 starts the timer 84.

Proceeding to step 112, the manager 76 broadcasts the operation to the relevant database nodes 56. At step 114, the manager 76 accesses shared memory 64 and sets the relevant memory stores 90 to a transmit value of −1. Next, at state 116, the manager 76 waits for the operation to be executed in the relevant database nodes 56 and the results stored in the relevant memory stores 90. The manager 76 remains in wait state 116 until the first occupance of the counter 82 going to zero or the expiration of the timer 84. While the manager 76 is in the wait state 116, the reply manager 66 decrements the counter 82 for each response received from a database node 56. Thus, the counter 82 will go to zero upon a response being received from each of the relevant database nodes 56 to which the operation was transmitted. Expiration of the timer 84 represents the maximum amount of time the manager 76 will wait for the operation to be executed and the results stored.

In response to the event of the counter 82 going to zero or the timer 84 expiring, the manager 76 proceeds to step 118. At step 118, the manager 76 queries the relevant stores 90 to determine a status of the operation. Next, at decisional step 120, if the operation was successful, the YES branch of decisional step 120 leads to step 122. At step 122, the manager 76 reports to the interface 60 that the operation was successful. At step 124, the manager 76 records the successful operation in the journal file 68. Step 124 leads to the end of the manager 76 process.

Returning to decisional step 120, if the operation was unsuccessful, the NO branch of decisional step 120 leads to step 126. At step 126, the manager 76 reports to the interface 60 that the operation was unsuccessful. Step 126 also leads to the end of the process.

Referring to FIG. 4B, the method begins at step 150 in which the reply manager 66 receives a response from an ImServer 95 of a database node 56. As previously described, the response includes an identification of the ImServer 95, the database node 56 of the ImServer 95 and a result of the operation in the database node 56.

Next, at decisional step 152, if the result is successful, the YES branch of decisional step 152 leads to step 154. At step 154 the reply manager 66 accesses the shared memory 64 and sets the memory store 90 associated with the ImServer of the database node 56 to a success value of 1. Returning to decisional step 152, if the result is unsuccessful, the NO branch of decisional step 152 leads to step 156. At step 156, the reply manager 66 accesses the shared memory 64 and sets the associated memory store 90 to an unsuccessful value of 0.

Steps 154 and 156 lead to step 158. At step 158, the reply manager 66 decrements the counter 82 to indicate that the database node 56 has responded. Step 158 leads to the end of the process. The reply manager process is repeated each time a response is received for a database node 56. Thus, as responses to operations are received, the memory stores 90 in shared memory 64 are updated to reflect the results of the operations and the counter decremented.

A particular embodiment of the present invention is described in extreme detail below, including DBM process detail design, DBM Reply process detail design, ImServer process detail design and shared memory implementation design. In this embodiment, the DBM process (DbmObj instance) initially reads the command line parameter called OPERATION$_{13}$ TIMEOUT and sets the time-out period (Time$_{13}$ Out$_{13}$ For$_{13}$ Response). If there is no OPERATION$_{13}$ TIMEOUT command line parameter, then it sets the time out period to a default time out period. Next, the DBM process (DbmObj instance) reads the command line parameter called DBMREPLY$_{13}$ RETRY counter and sets the DBMReply restart counter (Dbmreply$_{13}$ Restart$_{13}$ Counter). Next, the DBM process (DbmObj instance) needs to create the shared memory which is used by DBM process (DbmObj instance and DbModObj instance) and DBMReply process. Finally the DBM process (DbmObj instance) will fork a child process before it goes on to provide service loop, save the child process I.D. and overlay the DBMReply process on top of the child process.

The shared memory which is used by DBM process (DbmObj instance and DbModObj instance) and DBMReply process has the following structure. Class ServerOperationStatus: contains two information. NodeName: to which the request will be sent by DBM. OperationStatus: the status of the request whether the operation is successfully executed or not. This operation status is updated by DbmReply process. Class serverResponseType: contains five information. OperationTimeoutTime: this is set before sending the request from DbModObj to ImServer process. Once the request is sent the timer starts ticking. This timer is used to find out that the response never received or not. ReturnCode: this is the return code which is received by DbmReply process from ImServer process. This return code is updated by DbmReply and read by DBM process. This return code is sent by DbModObj process to the client (GUI). ReturnCodeMessage: this is the message arrived from the ImServer process to the DbmReply process. This is the explanation of the return code. This message is updated by DbmReply process and read by DbModObj process. DbModObj process sends this message to the client. ServerInfo: this is the serverOperationStatus class with SERVER$_{13}$ COUNT (constant number) number of elements. Each slot is used by each application node to record the information. RespondCounter: this is the number of respond received by DbmReply process from ImServer process. This is read by DbModObj process to decide whether it has received all the response or not. NumImServer: this is the total number of ImServer process to which the operation request is sent by DbModobj process. Class sharedResponseType: contains three information. ServerResponse: this is a shared memory array. This information is updated by DbModObj, DbmObj, DbmReply process and read by DbModObj and DbmReply process. Sem: this is a semaphore to lock and unlock the shared memory before reading and writing. NumOfEle: this is the number of DbModObj process.

Initially, all operationStatus values are initialized to –2 for each DbModObj instance and the responseCounter is initialized to 0 for each DbModObj instance. When an operation is received by the DBM process (DbModObj instance), it finds its instance number and goes to its own instance number slots, sets the operationStatus values to –1 for all servers, sets the returnCode to AIN$_{13}$ FAIL, sends the request along with the slot number to ImServer process of all the related nodes, increments the responseCounter by one for each server node, starts (operationTimeoutTime) the timer for response message from DBMReply process, and keep checking the responseCounter integer values of the slot.

If the timer is expired or all the responses from the ImServer process are arrived (responseCounter=0), then the DBM process (DbModObj instance) checks the returnCode value of the slot to see whether any of the request is successfully completed. If any of the request is successfully completed, then DBM process (DbModObj instance) updates the journal file in PM (Platform Manager) nodes by using the operationStatus information and sends the response returnCode to the client process. If there is no request successfully completed, then DBM process (DbModObj instance) sends the response returnCode to the client process. The returnCode will be updated every time the DBMReply process gets the return code from the ImServer process. At any time the returnCode is AIN$_{13}$ SUCCESS then the returnCode will not be updated. This final returnCode will be sent to the client from DBM process (DbModObj instance).

If the timer is expired or all the responses from the ImServer process are arrived (responseCounter=0) then the DBM process (DbModObj instance) also sets the integer responseCounter value to 0 to indicate that there is no outstanding response messages, sets the operationStatus values of the same slot to –2 to indicate that the slot is not used by any of the DbModObj instances and sets the status for each ImServer (out of service) for which the time out occurred to DB$_{13}$ OOS so that the next operation will not be sent to the same server node. This status will be set DB$_{13}$ INSERVICE (inservice) by restoring the application server node. In addition, the DBM process (DbModobj instance) will issue an alarm IPR for the server node to which the time out occurs. The IPR message should contain ImServer Instance, Object Name (FPH, CCD, VPN) and Node Name.

If the DBMReply process dies, then it will be restarted by DBM process (DbmObj instance) just like DbModObj instances. Initially, the DBM process (DbmObj instance) has the dbmreply$_{13}$ restart$_{13}$ counter set to 0. Every time the DBM process (DbmObj instance) restarts the DBMReply process, it adds one to the dbmreply$_{13}$ restart$_{13}$ counter and resets the operationTimeoutTimer for each DbModObj instances. If the dbmreply$_{13}$ restart$_{13}$ counter exceeds the Dbmreply$_{13}$ Restart$_{13}$ Counter then DBM process (DbmObj instance) will issue an alarm IPR and exit. This will cause the IPU to go down.

If the DbModObj instance dies, it will be restarted by the DBM process (DbmObj instance). When it restarts, the corresponding operationStatus values will be set to –2 to indicate that no DbModObj instances is holding it.

For the responseCounter, 0 means there is no outstanding response messages, >0 means that there are outstanding response messages and <0 is an invalid value. For all operationStatus elements, –2 means that the slots are not used by any of the DbModobj instances, –1 means that the slots are being used by DbModObj instance, 1 means that an ImServer in a particular node executed the operation successfully and 0 means that an ImServer in a particular node executed the operation unsuccessfully.

Initially, the DBMReply process needs to attach to the shared memory which is created by the DBM process (DbmObj instance). Once it is attached to the shared memory, it goes in to the provide service loop and waits for the message to come in from the ImServer process. The response message contains the information including a slot number indicating which instance of the DBM process (DbModObj instance) received the response message, a status (success or failure) of the operation execution, returnCodeMessage depend on the operationStatus and the node which executed the operation (an index between 0 and SERVER$_{13}$ COUNT currently).

The DBMReply process uses the first information to identify the slot number in the shared memory belongs to DBM process (DbModObj instance) and DBMReply process. Then it uses the fourth information to find out the node for which the reply is arrived. If the slot is not being used by the DbModObj instance (if the value is not −1) then DBMReply process discards the response message. If the slot is used by the DbModObj instance (if the value is −1) then DBMReply sets the value which belongs to the particular ImServer to 1 if the return code for the ImServer process is other than AIN$_{13}$ FAIL or IM$_{13}$ Fail, sets the value which belongs to the particular ImServer to 0 if the return code for the ImServer process is IM$_{13}$ FAIL or AIN$_{13}$ FAIL and sets the returnCode to the return code of the ImServer process if the current returnCode is other than AIN$_{13}$ SUCCESS.

ImServer process is modified such that the Start, Insert, Update, Delete, Lookup, Abort, and Commit operation needs to add two additional parameters; DbModObj instance number and node (currently 0 to SERVER$_{13}$ COUNT) for the ImServer. Both parameters are obtained from DBM process (DbModObj instance) and sent to DBMReply process through ImServer process. At the end of each operation, instead of returning the return code of the operation to DBM process (DbModObj instance), DBMReply dome registered function needs to be called to send the DbModObj instance number, index (currently 0 to SERVER$_{13}$ COUNT) of the ImServer and operation results to DBMReply process.

Although the present invention has been described with several embodiments, various changes and modifications maybe suggested to one skilled in the art. It is intended that the present invention encompass such changes and modifications as fall within the scope of the appended claims.

What is claimed is:

1. A method of provisioning databases in a telecommunications system, comprising the steps of:
   storing data for a telephony service in a plurality of redundant database nodes;
   receiving an operation to be performed in the redundant database nodes;
   automatically broadcasting the operation to the redundant database nodes for execution so that the redundant database nodes perform the operation simultaneously in parallel fashion;
   receiving responses from the redundant database nodes, each response including an identification of the redundant database node transmitting the response and a result of executing the operation in the redundant database node;
   automatically storing the results of the responses received from the redundant database nodes;
   in response to an event, automatically querying the stored results to determine a status of the operation; and
   automatically reporting the status of the operation.

2. The method of claim 1, wherein the event is an expiration of a response period.

3. The method of claim 2, further comprising the step of using a timer to time the response period, the event being the expiration of the timer.

4. The method of claim 1, wherein the event is receiving a response from each of the redundant database nodes.

5. The method of claim 4, further comprising the steps of:
   setting a counter to represent the number of redundant database nodes;
   in response to receiving a response from a redundant database node, automatically adjusting the counter to indicate receipt of the response; and
   the event being the counter indicating receipt of a response from each of the redundant database nodes.

6. The method of claim 5, wherein the counter is set equal to the number of redundant database nodes, the counter is automatically decremented to indicate receipt of the response and the event is the counter being zero.

7. The method of claim 1, wherein the event is the first occurrence of an expiration of a response period or receipt of a response from each of the redundant database nodes.

8. The method of claim 1, wherein the status of the operation is successful if at least one of the results of executing the operation in a redundant database node is successful.

9. The method of claim 8, if the status of the operation is successful, further comprising the step of automatically logging the operation in a journal.

10. The method of claim 1, wherein the operation is received from an interface for the telephony service and the status of the operation is reported to the interface for the telephony service.

11. The method of claim 1, wherein the results are stored in a shared memory having a plurality of stores each associated with one of the redundant database nodes, further comprising the steps of:
   resetting the stores to an initial value;
   in response to receiving from a redundant database node a response having an unsuccessful result, automatically setting the store associated with the redundant database node to an unsuccessful value;
   in response to receiving from a redundant database node a response having a successful result, automatically setting the store associated with the redundant database node to a successful value; and
   wherein the status of the operation is determined from the values in the stores.

12. The method of claim 11, further comprising the step of setting the stores to a transmitted value in response to broadcasting the operation to the redundant database nodes.

13. The method of claim 12, wherein the initial value is −2, the transmitted value is −1, the unsuccessful value is 0 and the successful value is 1.

14. A method of provisioning databases in a telecommunications system, comprising the steps of:
   storing data for a telephony service in a plurality of first redundant database nodes;
   receiving a first operation to be performed in the first redundant database nodes:
   automatically broadcasting the first operation to the first redundant database nodes for execution;
   receiving responses from the first redundant database nodes, each response including an identification of the first redundant database node transmitting the response and a result of executing the first operation in the first redundant database node;
   automatically storing the results of the responses received from the first redundant database nodes;
   in response to an event, automatically querying the stored results to determine a status of the first operation;
   automatically reporting the status of the first operation;
   storing data for a second telephony service in a plurality of second redundant database nodes;
   providing a shared memory having a plurality of first stores each associated with one of the first redundant database nodes and a plurality of second stores each associated with one of the second redundant database nodes;

wherein responses received from the first redundant database nodes are stored in the first stores and the first stores are queried to determine a status of the first operation;

receiving a second operation to be performed in the second redundant database nodes;

automatically broadcasting the second operation to the second redundant database nodes for execution;

receiving responses from the second redundant database nodes, each response including an identification of the second redundant database node transmitting the response and a result of executing the second operation in the second redundant database node;

automatically storing the results of the responses received from the second redundant database nodes in the second stores;

in response to a second event, automatically querying the second stores to determine a status of the second operation; and automatically reporting the status of the second operation.

15. The method of claim 14, wherein the event is the first occurrence of an expiration of a first response period or receipt of a response from each of the first redundant database nodes and the second event is the first occurrence of an expiration of a second response period or receipt of a response from each of the second redundant database nodes.

16. The method of claim 14, further comprising the steps of:

in response to receiving the first operation, resetting the first stores to an initial value;

in response to broadcasting the first operation to the first redundant database nodes, setting the first stores to a transmitted value;

in response to receiving from a first redundant database node a response having an unsuccessful result, automatically setting the first store associated with the first redundant database node to an unsuccessful value;

in response to receiving from a first redundant database node a response having a successful result, automatically setting the first store associated with the first redundant database node to a successful value;

wherein the status of the first operation is determined from the values in the first stores;

in response to receiving the second operation, resetting the second stores to the initial value;

in response to broadcasting second the operation to the second redundant database nodes, setting the second stores to the transmitted value;

in response to receiving from a second redundant database node a response having an unsuccessful result, automatically setting the second store associated with the second redundant database node to the unsuccessful value;

in response to receiving from a second redundant database node a response having a successful result, automatically setting the second store associated with the second redundant database node to the successful value; and wherein the status of the second operation is determined from the values in the second stores.

17. A method of provisioning databases in a telecommunications system, comprising the steps of:

storing data for a telephony service in a plurality of redundant database nodes each having a plurality of redundant processing modules;

receiving an operation to be performed in the redundant database nodes;

selecting a set of provisioning modules comprising a related provisioning module from each redundant database node;

automatically broadcasting the operation to the provisioning modules for execution in the redundant database nodes so that the redundant database nodes perform the operation simultaneously in parallel fashion;

receiving responses from the provisioning modules, each response including an identification of the provisioning module transmitting the response, the redundant database node of the provisioning module, and a result of executing the operation in the redundant database node;

automatically storing the results of the responses received from the provisioning modules;

in response to an event, automatically querying the stored results to determine a status of the operation; and automatically reporting the status of the operation.

18. A method of provisioning databases in a telecommunications system, comprising the steps of:

storing data for a telephony service in a plurality of redundant database nodes each having a plurality of redundant processing modules;

receiving a first operation to be performed in the redundant database nodes;

selecting a set of first provisioning modules comprising a related provisioning module from each redundant database node;

automatically broadcasting the first operation to the first provisioning modules for execution in the redundant database nodes;

receiving responses from the first provisioning modules, each response including an identification of the first provisioning module transmitting the response, the redundant database node of the first provisioning module, and a result of executing the first operation in the redundant database node;

automatically storing the results of the responses received from the first provisioning modules;

in response to an event, automatically querying the stored results to determine a status of the first operation;

automatically reporting the status of the first operation;

receiving a second operation to be performed in the redundant database nodes;

selecting a set of second provisioning modules comprising a related provisioning module from each redundant database node;

providing a shared memory having a plurality of first stores each associated with one of the first provisioning modules and a plurality of second stores each associated with one of the second provisioning modules;

wherein results of the responses received from the first provisioning modules are stored in the first stores and the first stores are queried to determine a status of the first operation;

automatically broadcasting the second operation to the second provisioning modules for execution in the redundant database nodes;

receiving responses from the second provisioning modules, each response including an identification of the second provisioning module transmitting the response, the redundant database node of the second provisioning module, and a result of executing the second operation in the redundant database node;

automatically storing the results of the responses received from the second provisioning modules in the second stores;

in response to a second event, automatically querying the second stores to determine a status of the second operation; and automatically reporting the status of the second operation.

19. A database provisioning system, comprising:

a plurality of redundant database nodes each comprising a provisioning module and a database storing data for a telephony service;

a manager module operable to automatically broadcast an operation to the redundant database nodes for execution by the provisioning modules on the databases, the redundant database nodes operable to perform the operation simultaneously in parallel fashion in response to the automatic broadcast;

a reply module operable to receive responses from the redundant database nodes, the responses each including a result of executing the operation in the redundant database node;

the reply module operable to automatically store in a shared memory the results of the responses received from the redundant database nodes;

in response to an event, the manager module operable to automatically access the shared memory to determine a status of the operation based on the stored results; and the manager module operable to automatically report the status of the operation.

20. The database provisioning system of claim 19, further comprising:

the shared memory comprising a plurality of stores each associated with one of the redundant database nodes;

the manager module operable to reset the stores to an initial value in response to receiving the operation;

the manager module operable to set the stores to a transmit value in response to broadcasting the operation to the redundant database nodes;

the reply module operable to set a store associated with a redundant database node to an unsuccessful value in response to receiving from the redundant database node a response having an unsuccessful result;

the reply module operable to set a store associated with a redundant database node to a successful value in response to receiving from the redundant database node a response having a successful result; and wherein the status of the operation is determined from the values in the stores.

* * * * *